Figure 1:
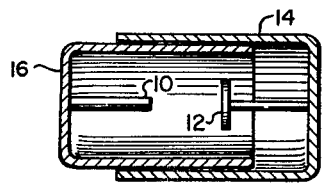

Jan. 5, 1965   A. T. BIEHL ETAL   3,164,722
RADIOACTIVE TRANSDUCER FOR SENSING PRESSURE AND THE LIKE
HAVING A SOURCE OF PRIMARY RADIATION AND A TARGET
FOR PRODUCING SECONDARY RADIATION
Filed May 2, 1962

INVENTORS
ARTHUR T. BIEHL
GUSTAVE A. LINENBERGER
BY
ATTORNEY

United States Patent Office 3,164,722
Patented Jan. 5, 1965

3,164,722
RADIOACTIVE TRANSDUCER FOR SENSING PRESSURE AND THE LIKE HAVING A SOURCE OF PRIMARY RADIATION AND A TARGET FOR PRODUCING SECONDARY RADIATION
Arthur T. Biehl, Walnut Creek, and Gustave A. Linenberger, Alamo, Calif., assignors, by mesne assignments, to the United States of America as represented by the United States Atomic Energy Commission
Filed May 2, 1962, Ser. No. 191,971
15 Claims. (Cl. 250—83.3)

This invention relates to transducers generally, and more particularly, to transducers employing radioactive materials.

There are a vast number of methods that now exist for quantitatively measuring physical changes such as temperature, pressure, and strain in materials. Generally, they can be categorized into two major groups; those that are self contained and permit local readout, and those that permit remote readout.

Members of the latter group are characterized by the separation of the two primary elements, a local sensing element (transducer) and a remote readout element (receiver). Typical examples of this group are the common thermocouple and the resistance strain gage. Except for a few specialized optical systems, substantially all of this group require some connecting means between the local sensing element and the remote readout element. In the case of the thermocouple and resistance strain gage, the connecting means are wires which carry an electrical signal. Thus, the wires become in effect a third element between the local sensing element and the remote readout element. It has been found that the presence of the connecting means seriously restricts the applications for measuring physical changes in materials.

Therefore, the principal object of the present invention is to provide a novel transducer that does not require any physical connection to its associated readout device.

Another object of this invention is to provide a novel transducer for converting physical changes in materials into radioactive emissions.

In its principal aspect the present invention comprises a radiation source in association with a target element which produces secondary radiation when exposed to bombardment by primary radiation from the source, the intensity of the secondary radiation being proportional to the distance of the target from the source. The source and the target are mounted in spaced relation within a small flexible capsule such that any change in capsule length will produce a corresponding change in the distance between the source and target. By placing the capsule within a material, physical changes in the material will alter the capsule length, hence source-target spacing, which results in a measurable change in the secondary radiation emitted from the target.

In another embodiment, a movable collimating device is arranged in the capsule intermediate the source and target to provide increased sensitivity of operation. The secondary radiation emission from the target is then dependent on the solid angle between the source and target. The relative position of the collimating device is controlled by capsule length and the capsule length thereby controls the solid angle between the source and target.

Figure 2:
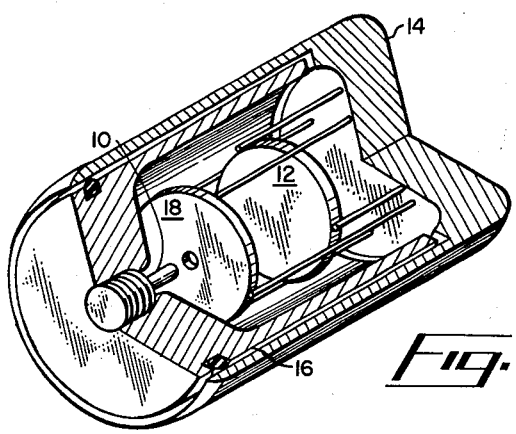
Figure 3:
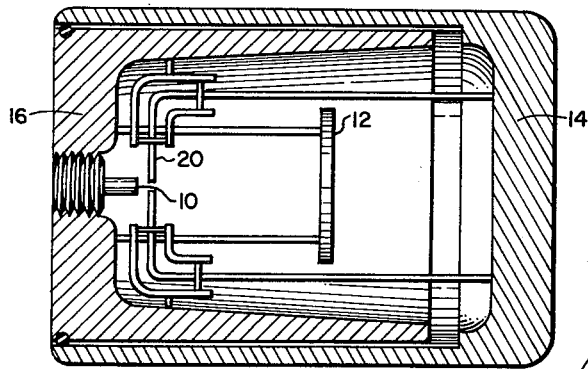
Figure 4:
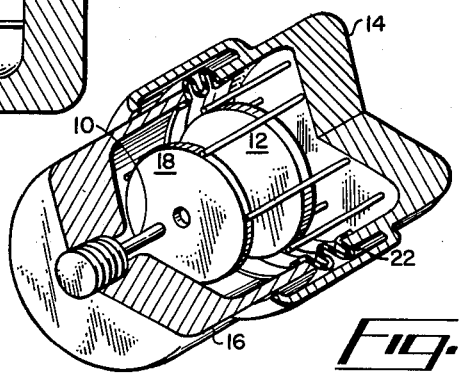
Figure 5:
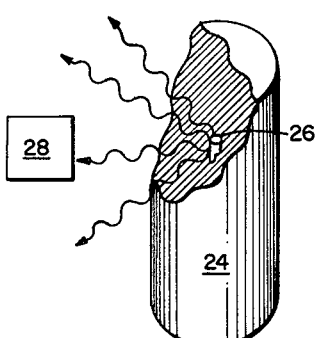

These and other objects, advantages, and features of this invention will be apparent to those skilled in the art from the following description taken together with the appended drawings, wherein like members bear identical numbers:

FIGURE 1 is a longitudinal sectional view of the basic radioactive transducer,

FIGURE 2 is an isometric view, partially shown in longitudinal section, and showing an alternate transducer design adapted for strain measurement, FIGURE 3 is a longitudinal sectional view showing yet another transducer design adapted for strain measurement, FIGURE 4 is an isometric view, partially shown in longitudinal section, and showing still another transducer design adapted for pressure measurement, and FIGURE 5 is a pictorial view of a radioactive transducer receiver system for measuring the strain within a material.

Referring now to FIGURE 1 which shows the basic radioactive transducer, a radiation source 10 and a target element 12 are mounted in a spaced relation in a flexible enclosure formed by the source mounting member 14 and the target mounting members 16. The target element 12 is of a material that will emit secondary radiation when exposed to the primary radiation of said source 10, in proportion to the distance of said target 12 from said source 10.

Radioactive particles undergo two main types of reactions with matter. The first type, absorption, is characterized by the entrance of the particles into the nuclei of the material, forming new nuclides and frequently yielding secondary radiation. The second type is scattering, in which the radioactive particle interacts with the material but remains free after the reaction.

It is known that certain light elements, for example, beryllium, lithium, boron, and fluorine, when placed in close proximity to an alpha particle source, will absorb the alpha particles and emit secondary radiation. An example of this reaction, between a beryllium atom and an alpha particle, is given below and can be represented as:

$$Be^9 + \alpha \rightarrow \eta + C^{12*}$$

which can be abbreviated to:

$$Be^9(\alpha,\eta)C^{12*}$$

where:

$Be^9$ represents the beryllium target atom,
$\alpha$ represents the alpha particle
$\eta$ represents a neutron
$C^{12*}$ a carbon-12 atom (excited state)

The beryllium target atom will absorb the alpha particle resulting in the formation of an excited state carbon-12 atom and the emission of a secondary neutron. The excited state carbon-12 atom will decay immediately to the ground state by emitting a 4.4 mev. gamma photon. This can be represented as:

$$C^{12*} \rightarrow \gamma + C^{12}$$

where:

$C^{12*}$ represents the carbon-12 atom (excited state)
$\gamma$ represents the gamma photon
$C^{12}$ represents the carbon-12 atom (ground state)

The net result of the alpha particle-beryllium reaction is the formation of a carbon-12 atom and the emission of a neutron and a gamma photon.

The same or similar reactions take place between alpha particles and the other light elements previously mentioned. Also gamma rays will undergo similar reactions with the same light elements.

Alpha particle emitters and gamma ray emitters are therefore examples of a suitable radiation source 10. Other materials which will serve as alpha particle emitters include polonium-210, radium-226, plutonium-239, plutonium-240, and curium-242. Materials which will serve as a gamma ray emitter include cerium-144, antimony-124, and cobalt-56.

The radioactive particles from the source 10 will impinge upon the target element 12 with which it is associated. The target 12 may be constructed of certain light elements; for example, beryllium, lithium, boron, and fluorine, which will emit secondary radiation when exposed to the primary radiation from the source 10. For any given source, the yield of secondary radiation from the target 12 will depend upon the surface area of the target exposed to the source 10, and the distance between the source 10 and the target 12. It follows that an increase in target area or a decrease in distance will result in an increase in the secondary radiation yield.

The basic radioactive transducer as shown in FIGURE 1 includes means by which the distance between the source 10 and target 12 can be varied. The target 12 is mounted within a substantially cupshaped structural member 14. A second structural member 16 which mounts the source 10 is slidably within the target mounting member 14. The source mounting member 16 and the target mounting member 14 together form a flexible enclosure for the source 10 and target 12. The movement of the source mounting member 16 within the target mounting member 14 changes the distance between the source 10 and target 12, thereby controlling the secondary radiation yield from the target 12. Although not shown in this embodiment, a flexible member interconnecting the cup shaped member 14 and the source mounting member 16 could be used to give this or other embodiments bi-directional characteristics.

The sensitivity of the transducer can be increased if means are also provided to vary the effective area of the target 12 as well as the distance between the source 10 and target 12. FIGURE 2 shows an alternate transducer design which incorporates this feature. A collimator element 18 is mounted within the target mounting member 14 and arranged between the source 10 and target 12. The collimating element 18 is fixed in relation to the target 12 and moves with the target in relation to the source 10 and as an example consists of a plate with a small central opening on the center line between the source 10 and target 12. Suitable materials for the collimator plate include brass, steel, and lead, which would absorb the primary radiation from the source without giving rise to secondary radiation. The opening of the collimator 18 controls the degree of divergence of the primary radiation from the source 10, or conversely, the surface area of the target 12 on which this primary radiation can impinge. Thus a reduction in distance between the source 10 and target 12 is accompanied by a reduction of the effective surface area of the target 12, the combined effect being a change in the solid angle between the source 10 and target 12.

FIGURE 3 shows an alternate transducer for providing an increase in transducer sensitivity. In this alternate design of the basic radioactive transducer, a variable shutter element 20 is mounted within the target mounting member 14 and extends between the source 10 and target 12. The inner surface of the source mounting member 16 is tapered and contacts the extension of the shutter element 20 between the source 10 and target 12. The inner diameter of the source mounting member 16 decreases from its open end to the closed end thereof. The shutter opening is controlled by this diameter such that any movement of the source mounting member 16 into the target mounting member 14 will decrease the shutter opening as well as decrease the distance between the source 10 and target 12. When source mounting member 16 is moved into target mounting member 14, the extension of shutter element 20 follows the inner tapered bore of source mounting member 16. The distance between the ends of the two shutter elements 20 adjacent the radiation source 10 is thereby decreased, thus providing an adjustable shutter element between source 10 and target 12.

Reference is made to FIGURE 4 for a pressure sensitive transducer design. The target mounting member 14 and source mounting member 16 are connected by a spring loaded bellows 22. The bellows 22 provides a pressure sealing means between the two members. The enclosure formed by the target mounting member 14, the source mounting member 16, and the spring loaded bellows 22 is evacuated. Thus the movement of the source mounting member 16 with respect to the target mounting member 14 is controlled by pressure external to the enclosure.

The transducer shown in FIGURE 4 can easily be adapted to a temperature sensitive design. Instead of evacuating the enclosure, it is filled with a fluid which changes its volume with temperature. In this manner, the movement of the source mounting member 16 with respect to the target mounting member 14 is controlled by the temperature of the surrounding medium.

Referring to FIGURE 5, there is shown a pictorial view of a radioactive transducer-receiver system for measuring the strain within a material. To measure the strain within a material 24, a transducer 26, for example that embodiment illustrated in FIGURE 2, is placed within the material. The transducer 26 can be cast into a mass of material to measure the internal strain of the material. The internal strain of the material will produce a measurable change in the secondary radiation emitted from the target 12 of the transducer 26. The deformation in the material produced by the strain will affect the length of the transducer 26 thereby producing relative movement between the source mounting member 16 and the target mounting member 14. The relative movement will in turn produce a change in the solid angle between the source 10 and target 12 which creates the change in secondary radiation from the target. For the transducer to be useful, receiving means 28 must be provided external to the material to quantitatively measure the change in secondary radiation from the transducer.

Depending upon the source material and target material, the secondary radiation emitted from the transducer will be neutrons and/or gamma rays. There are various means by which these two radiations can be quantitatively detected and recorded. Gaseous ionization detectors with a boron trifluoride gas are suitable for neutron detection. The electrical current produced by the ionization is easily recorded. Solid state radiation detectors are suitable for gamma ray detection. Scintillation crystals such as sodium iodide produce optical or electrical signals which can easily be recorded. Further examples of radiation detection and recording apparatus are set forth in Section 16, "Radiation Detection and Recording," Nondestructive Testing Handbook, volume 1, Roland Peers Company, New York 1959. The recorded data can be correlated to the internal strain of the material.

By the use of the various transducers illustrated, the effects of temperature, pressure, and strain within a material can be measured. Since there is no physical connection between the transducer and its associated receiver, this can be done without distorting the material with any connecting means such as wires. The transducers also have application in rotating machinery parts, rolling mill billets, high pressure fluid systems and many other systems.

While a number of details of construction and alternate embodiments have been illustrated and described, alternatives and equivalents will occur to those skilled in the art which are within the scope and spirit of this invention. It is, therefore, desired that the protection be not limited to the details herein illustrated and described but only by the proper scope of the appended claims.

What is claimed is:

1. A transducer comprising; a first substantially cup shaped structural member, a second structural member slidable within said first structural member, a primary radiation source associated with said second structural member, and target means associated with said first structural member in a spaced relationship to said source for emitting secondary gamma and neutron radiation discriminately detectable without physical connection to said target means when exposed to the primary radiation of said source.

2. A transducer comprising; a radiation source, target means associated with said source for emitting secondary gamma and neutron radiation discriminately detectable without physical connection to said target when exposed to the primary radiation of said source which is proportional to the distance of the target means from said source, a structural member for mounting said source, a second structural member for mounting said target means, and a flexible connecting member arranged between said source mounting member and said mounting member for said target means to form an enclosure therewith for said source and said target means.

3. A transducer as described in claim 2 wherein said radiation source is a gamma ray emitter.

4. A transducer as described in claim 3 wherein said gamma ray emitter is taken from the group consisting of cerium-144, antimony-124 and cobalt-56.

5. A transducer as described in claim 2 wherein said radiation source is an alpha particle emitter.

6. A transducer comprising; means for the emission of primary radiation, means associated with said emission means for emission of secondary gamma and neutron radiation discriminately detectable without physical connection to said secondary emission means when exposed to primary radiation from said emission means, said secondary radiation being proportional to the distance from said emission means, and means for mounting said emission means and said secondary emission means in a spaced relation, said mounting means forming a flexible enclosure for said emission means and said secondary emission means.

7. A transducer comprising; a first cup shaped structural member, a second cup shaped structural member slidable within said first structural member, an alpha particle source of primary radiation mounted within said second structural member, a target element mounted within said first structural member, said target being adapted to emit secondary gamma and neutron radiation discriminately detectable without physical connection to said target element when exposed to the primary radiation of said source, which secondary radiation is proportional to the solid angle formed between said source and said target, and a colliminating element mounted within said first structural member, said colliminating element being arranged between said source and said target whereby the movement of said colliminating element effects a change in the solid angle between said source and said target.

8. A transducer as described in claim 7 wherein said alpha particle source is taken from the group consisting of polonium-210, radium-226, plutonium-239, plutonium-240, and curium-242.

9. A transducer as described in claim 7 wherein said target element is taken from the group consisting of beryllium, lithium, boron, and fluorine.

10. A transducer comprising; a first cup shaped structural member, a second cup shaped structural member slidable within said first structural member, said second structural member having a tapered inner surface, an alpha particle source mounted within said second structural member, a target element mounted within said first structural member in spaced relation to said source whereby said target emits gamma rays and neutrons when exposed to alpha particles from said source proportional to the solid angle formed with said source, and a variable shutter element mounted to said first structural member, and extending between said source and said target to contact the tapered inner surface of said second structural member, whereby the movement of said second structural member varies the opening of said shutter element to control the solid angle between said source and said target.

11. A transducer as described in claim 10 and in addition, pressure sealing means arranged between said structural members whereby movement between said structural members is pressure controlled.

12. A transducer as described in claim 10 and in addition, a fluid to fill the enclosure formed by said structural members, said fluid of such a nature as to change in volume with a change in temperature whereby movement between said structural members is temperature controlled.

13. A method of measuring strain within a material sample comprising placing within the material sample a pressure sensitive transducer which emits secondary gamma and neutron radiation proportional to physical stresses of the material sample within which the transducer is placed, and monitoring and translating the secondary radiation at a receiver external to and physically unconnected to said material sample.

14. A transducer comprising: a first cup shaped structural member, a second cup shaped structural member slidable within said first structural member, said second structural member having a tapered inner surface, a primary radiation source mounted within said second structural member, a target element mounted within said first structural member in spaced relation to said source whereby said target emits secondary gamma and neutron radiation when exposed to the primary radiation from said source proportional to the solid angle formed with said source, and a variable shutter element mounted to said first structural member and extending between said source and said target to contact the tapered inner surface of said second structural member, whereby the movement of said second structural member varies the opening of said shutter element so as to control the solid angle between said source and said target.

15. A transducer as described in claim 14 wherein said primary radiation source is a gamma ray emitter.

References Cited by the Examiner
UNITED STATES PATENTS

| | | | |
|---|---|---|---|
| 2,079,900 | 5/37 | Cohn | 250—51.5 |
| 2,707,555 | 5/55 | Gaudin | 250—83.1 |
| 2,745,969 | 5/56 | Keller | 250—106 |
| 2,800,591 | 7/57 | Gilman | 250—83.3 |
| 2,883,553 | 4/59 | Birden | 250—106 |
| 2,933,607 | 4/60 | Friedman | 250—43.5 |
| 2,968,729 | 1/61 | Pepper | 250—83.3 |

RALPH G. NILSON, *Primary Examiner.*